(12) United States Patent
Tione

(10) Patent No.: US 12,214,762 B2
(45) Date of Patent: Feb. 4, 2025

(54) SUPERVISING DEVICE FOR MONITORING THE OPERATION OF AN ANTI-SLIP DEVICE OF A RAILWAY BRAKING SYSTEM

(71) Applicant: FAIVELEY TRANSPORT ITALIA S.P.A., Turin (IT)

(72) Inventor: Roberto Tione, Turin (IT)

(73) Assignee: Faiveley Transport Italia S.P.A., Turin (IT)

( * ) Notice: Subject to any disclaimer, the term of this patent is extended or adjusted under 35 U.S.C. 154(b) by 820 days.

(21) Appl. No.: 17/593,050

(22) PCT Filed: Mar. 6, 2020

(86) PCT No.: PCT/IB2020/051960
§ 371 (c)(1),
(2) Date: Sep. 7, 2021

(87) PCT Pub. No.: WO2020/183320
PCT Pub. Date: Sep. 17, 2020

(65) Prior Publication Data
US 2022/0176936 A1    Jun. 9, 2022

(30) Foreign Application Priority Data
Mar. 8, 2019  (IT) ......................... 102019000003423

(51) Int. Cl.
*B60T 17/22*   (2006.01)
*B60T 8/17*    (2006.01)
(Continued)

(52) U.S. Cl.
CPC .......... *B60T 17/228* (2013.01); *B60T 8/1705* (2013.01); *B60T 8/17616* (2013.01); *B60T 8/3235* (2013.01)

(58) Field of Classification Search
CPC ............ B60T 17/228; B60T 17/17616; B60T 8/3235; B60T 8/1705
See application file for complete search history.

(56) References Cited

U.S. PATENT DOCUMENTS 5,244,171 A   9/1993   Drake et al.
6,600,979 B1  7/2003   Kumar et al.
(Continued)

FOREIGN PATENT DOCUMENTS

EP   3056397 A1   8/2016
EP   3393873 B1   11/2019
(Continued)

OTHER PUBLICATIONS

Japanese Patent Office, Office Action Issued in Application No. 2021-552182, Oct. 4, 2022, 16 pages. (Submitted with Partial Translation).

(Continued)

*Primary Examiner* — Vishal R Sahni
(74) *Attorney, Agent, or Firm* — K&L Gates LLP

(57) ABSTRACT

A supervising device for monitoring the operation of an anti-slip device is described; the supervising device is arranged to:
acquire estimated instantaneous linear speeds associated with axles controlled by the anti-slip device;
compare the estimated instantaneous linear speeds with a linear reference speed;
monitor the state of the pressures to the brake cylinders;
determine whether the anti-slip device is working correctly, depending on predetermined trends of each of the estimated instantaneous linear speeds associated with the axles in the slipping phase, with respect to the reference linear speed, in association with each of the pressures to the brake cylinders associated with the axles (Continued)

adjust the preloaded time value in at least one of the timing devices when the supervising device determines that the anti-slip device is not working correctly.

20 Claims, 10 Drawing Sheets

(51) Int. Cl.
*B60T 8/1761* (2006.01)
*B60T 8/32* (2006.01)

(56) References Cited

U.S. PATENT DOCUMENTS

| | | | |
|---|---|---|---|
| 2005/0212354 A1* | 9/2005 | Tione | B60T 8/885 303/20 |
| 2013/0338860 A1* | 12/2013 | Herden | B61H 9/00 701/20 |
| 2014/0319904 A1* | 10/2014 | Watanabe | B60T 8/176 303/119.1 |

FOREIGN PATENT DOCUMENTS

| | | |
|---|---|---|
| JP | S5425393 A | 2/1979 |
| JP | H06133404 A | 5/1994 |
| JP | 2004210277 A | 7/2004 |
| WO | 2006092263 A1 | 9/2006 |
| WO | 2013134918 A1 | 9/2013 |
| WO | 2017175108 A1 | 10/2017 |

OTHER PUBLICATIONS

"Railway Applications—The Specification and Demonstration of Reliability, Availability, Maintainability and Safety (RAMS)," BSI Standards Publication, BS EN 50126-1: 2017, Nov. 30, 2017, 106 pages.
"Railway applications—Communication, signalling and processing systems—Safety related electronic systems for signalling," NSAI Standards, I.S. EN 51029: 2018, Nov. 23, 2018, 17 pages.
ISA European Patent Office, International Search Report Issued in Application No. PCT/IB2020/051960, Apr. 28, 2020, WIPO, 3 pages.
Abdullah, A., "Cenelec EN 50128: Railway Applications—Communication, signaling and processing systems, Software for railway control and protection systems," Safety Critical Systems: Standards and Certification, May 2020, 5 pages.

* cited by examiner

SUPERVISING DEVICE FOR MONITORING THE OPERATION OF AN ANTI-SLIP DEVICE OF A RAILWAY BRAKING SYSTEM

CROSS REFERENCE TO RELATED APPLICATIONS

The present application is a U.S. National Phase of International Application No. PCT/IB2020/051960 entitled "SUPERVISING DEVICE FOR MONITORING THE OPERATION OF AN ANTI-SLIP DEVICE OF A RAILWAY BRAKING SYSTEM," and filed on Mar. 6, 2020. International Application No. PCT/IB2020/051960 claims priority to Italian Patent Application No. 102019000003423 filed on Mar. 8, 2019. The entire contents of each of the above-listed applications are hereby incorporated by reference for all purposes.

TECHNICAL FIELD

The present disclosure generally relates to the field of railway braking systems. In particular, the disclosure relates to a supervising device for monitoring the operation of an anti-slip device of a railway braking system.

BACKGROUND AND SUMMARY

In the railway transport system, the instantaneous adhesion value between the wheel and the rail represents the maximum braking force limit currently applicable to the axles without the wheels of said axles starting a progressive slipping phase.

If an axle enters the slipping phase, if the applied braking force is not promptly and suitably reduced, the axle gradually loses angular speed until it reaches complete locking, with consequent immediate overheating and damage due to overtemperature of the surface of the wheels of said axle at the point of contact between the wheels and the rail. It is known that this situation, in addition to greatly lengthening the stopping distances due to a further reduction in the friction coefficient, can cause derailment at high operating speeds of the vehicle.

To overcome the drawback previously described, pneumatic railway braking systems are equipped with a protection system, known as an anti-slip system.

A known anti-slip system is illustrated in FIG. 1, for a four-axle vehicle 102, 103, 104, 105. A braking system 110 produces the pneumatic braking pressure as a function of a request for braking pressure or braking force, not shown in FIG. 1, by supplying brake cylinders 111, 112, 113, 114. Each of these brake cylinders is in charge of braking the axles 102, 103, 104, 105, respectively, by means of pneumatic supply conduits 115, 116. Four anti-slip valve units 117, 118, 119, 120, piloted by an anti-slip device 101, are interposed between the pneumatic supply conduits 115, 116 and the respective brake cylinders 111, 122 and 113, 114. Angular speed sensors 106, 107, 108, 109 detect the angular speed of the axles 102, 103, 104, 105, respectively. Said angular speed sensors 106, 107, 108, 109 are electrically connected to the anti-slip device 101, continuously supplying an electric signal representing the instantaneous angular speed information of each axle 102, 103, 104, 105. The anti-slip device 101 continuously estimates the instantaneous linear speed of the vehicle through operations performed on the information of the estimated instantaneous linear speed of the axles 102, 103, 104, 105 derived from the relative measured angular speeds. These operations are known to those skilled in the art, such as, for example, but not exclusively, the calculation of the average between the four speeds, or the instantaneous maximum value between the four instantaneous linear speeds of the axles 102, 103, 104, 105, or else, as illustrated in FIG. 3, the maximum value between the four instantaneous speeds 301, 302, 303, 304 associated with the axles 102, 103, 104, 105 and a fifth value, a derived virtual speed 305, obtained by decreasing the speed value obtained at the previous sampling cycle of the system decreased by the maximum admissible deceleration value for the vehicle in question multiplied by the sampling period.

By continuously evaluating differences ΔV between the estimated instantaneous linear speed of the single axle and the estimated instantaneous linear speed of the vehicle, the anti-slip device 101 detects whether one or more axles have started a slipping phase. If one or more axles have started a slipping phase, the anti-slip device controls the slipping of said axles by appropriately reducing and modulating the pressure to the brake cylinders relating to the slipping axles, acting on the valve units relating to said slipping axles by means of known algorithms, for example described in EP3393873, WO2017175108, preventing said axles from incurring a blocking state and trying to obtain the best braking force while remaining in the slipping phase.

Said anti-slip valve units 117, 118, 119, 120 each assume the detailed shape represented by the pair of pneumatic solenoid valves 220, 221, illustrated in FIG. 2.

The pneumatic solenoid valves 220, 221 are energized by the anti-slip device 201 by means of respective switching elements 202, 203. Such switching elements 202, 203 are typically solid state electronic components.

For simplicity of illustration, FIG. 2 does not show the connection of solenoids, i.e. electric coils, 204, 205 to ground.

The anti-slip valve units 117, 118, 119, 120 can assume four overall states.

The first state is defined as "filling" and corresponds to a state in which both the electro-pneumatic valves are de-energized, as shown in FIG. 2: the electro-pneumatic valve 220 allows access to the pressure present in a pneumatic conduit 215, corresponding to the pneumatic conduit 115, 116 of FIG. 1, to a brake cylinder 211, corresponding to the brake cylinder 111, 112, 113, 114 of FIG. 1, while the pneumatic solenoid valve 221 prevents the emptying of the brake cylinder 211 and of the pneumatic conduit 215 into the atmosphere. This state represents the rest, or non-intervention, state of the anti-slip device, as it actually constitutes a direct connection between the brake cylinder 211 and the pneumatic conduit 215, through which the brake system directly controls the pressure to the brake cylinder 211 from a null value to a maximum value.

The second state is defined as "holding" and corresponds to a state in which the pneumatic solenoid valve 220 is energized. In this case, the pressure in the brake cylinder 211 cannot be changed by pressure variations in the pneumatic conduit 215. The pneumatic solenoid valve 221 continues to keep the brake cylinder 211 isolated from the atmosphere. Overall, the pressure to the brake cylinder 211 maintains its value indefinitely unless there are leaks in the brake cylinder.

The third state is defined as "discharge" and corresponds to a state in which both the pneumatic solenoid valves 220, 221 are energized. In this case, the pressure in the brake cylinder 211 cannot be changed by pressure variations in the pneumatic conduit 215. The energized pneumatic solenoid valve 221 connects the brake cylinder 211 to the atmosphere, reducing the pressure to the brake cylinder, possibly down to the null value.

The fourth state is defined as "prohibited" and corresponds to a state in which only the pneumatic solenoid valve 221 is energized. In this case, the pneumatic solenoid valve connects both the brake cylinder 211 and the pneumatic conduit 215 directly to the atmosphere, causing an undue discharge to the atmosphere of the pressure produced by the brake system.

In order to systematically avoid the "prohibited" state, the switching element 203 is connected to a node 206 downstream of the switching element 202. In this way, if the switching element 203 was closed by an improper control of the upstream circuit or because of a short circuit thereof, it could not energize the pneumatic solenoid valve 221 unless the switching element 202 was also closed, in which case also the pneumatic solenoid valve 220 would be energized, effectively bringing the brake cylinder 211 to the "discharged" state, but avoiding undue discharge to the atmosphere of the pneumatic conduit 215.

Various pilot circuits of the pneumatic solenoid valves are known, referring to the power supply or referring to the ground, which however allow systematically avoiding the "prohibited" state.

In general, in its functional action the anti-slip system necessarily reduces the braking force. It is apparent that, in certain hardware or software failure modes, the anti-slip device can keep the pneumatic solenoid valves 220, 221 permanently energized with consequent total loss of the braking force. In order to limit cases of permanently energized valves, the European railway regulations UIC541-05 "BRAKES—SPECIFICATIONS FOR THE CONSTRUCTION OF VARIOUS BRAKE PARTS—WHEEL SLIDE PROTECTION DEVICE (WSP),"—EN15595 "Railway applications—Braking—Wheel slide protection" § 4.2.2, require the introduction of timeout-generating hardware timer devices 210, 212.

These timing devices are introduced to temporarily limit the continuous activation of the pneumatic solenoid valves 210, 212. In particular, the aforementioned rules impose a time limit of 10 s, generally respected by the majority of Railway Operators. However, there are Railway Operators who deem it appropriate to have times other than those recommended by the aforementioned regulations.

FIG. 2 illustrates the functional implementation of the control system of the anti-slip system. A microprocessor 207 executes axis recognition and control algorithms, for example but not exclusively described in EP3393873, WO2017175108, generating respective control signals 208, 209 for the switching elements 202, 203.

When the microprocessor 207 brings the control signal 208 to logic level "1," i.e. intending to activate the switching element 202, the transition 0→1 of the control signal 208 activates the timer device 210, which in turn brings an output 213 thereof to logic level "1" for a time interval T1 equal, for example but not exclusively, to 10 s. A logic gate 216 executes an AND function between the control signal 208 and the signal of the output 213, bringing a signal 214 to actually command the closing of the switching element 202, for the consequent energization of the pneumatic solenoid valve 220.

When the microprocessor 207 brings the control signal 208 to logic level "0," before the time T1 has expired, to de-energize the pneumatic solenoid valve 220, then it puts the timer device 210 in a reset condition through a low active input R thereof, preparing it for a subsequent transition 0→1.

Should the command signal 208 remain permanently blocked at logic level "1" due to a hardware failure of the microprocessor 207 or due to a software error of the anti-slip control algorithm, then the time T1 counted by the timer device 210 would expire, causing the return of signals 213, 214 to logic level "0" with consequent permanent de-energization of the pneumatic solenoid valve 220.

The same behavior occurs for the timer device 212 relative to the pneumatic solenoid valve 221.

In some cases, there is a pressure transducer 222 which indicates to the microprocessor circuit 207 the pressure upstream of the pneumatic solenoid valve 220 through a connection 224, and a pressure transducer 223 which indicates to the microprocessor circuit 207 the pressure to the brake cylinder 211 through a connection 225.

Circuit variants for implementing the function of timing and inhibition of the energization commands of the pneumatic solenoid valves 220, 221 are known.

The timing circuits illustrated in FIG. 2 are replicated for each anti-slip valve unit 111, 112, 113, 114.

The solution described above represents the prior art recognized by all railway operators and railway safety agencies as a method to reduce the risk that hardware failures or software problems may cause a permanent undue reduction in pneumatic pressure during braking.

In situations of correct operation, in order to keep one or more axles 102 . . . 105 in a controlled sliding state as long as the braking state remains in conditions of degraded adhesion, the anti-slip system performs continuous corrections to the pressure to the one or more brake cylinders 111 . . . 114, thus resetting the timer devices 210, 212.

However, the use of the timing circuits according to the prior art previously described exhibits counter-productive cases despite the fact that the anti-slip device is performing its function correctly.

A first case is illustrated in FIG. 4. In response to the brake request, the braking system 110 increases a pressure 404 to the brake cylinder 211. Due to a degraded adhesion condition between a wheel 202 and a rail 240, when the axle braking force generated by the pressure 404 exceeds the available adhesion force, the wheel 202 starts to slip. The estimated linear speed 401 of the axle detaches from the linear speed 402 of the train at the instant 403. Immediately, the anti-slip device 201, with its own algorithms, activates a "discharge" phase, causing transition 0→1 of the control signals 208, 209 for energizing the pneumatic solenoid valves 220, 221, respectively. From the instant 403, the pressure starts to drop and the timing devices 210, 212 activated by the transitions 0→1 start counting the times T1, T2, respectively. When the instantaneous estimated linear speed 401 of the axle enters a tolerance band 405, the anti-slip device 201 switches from the "discharge" phase to the "maintenance" phase, bringing the signal 209 to logic level "0" to de-energize the pneumatic solenoid valve 221. In this way the timing device 212 is reset. If the instantaneous estimated linear speed 401 remains within the tolerance band 405, the anti-slip device 201 keeps the "maintenance" state unchanged. In this case the timing device 210 continues to evolve reaching the value T1, bringing its output 213 to the logical state "0," de-energizing the switching element 202, returning the system to the filling state with consequent definitive locking of the wheels.

A second case illustrated in FIG. 5 occurs in cases of extremely low adhesion and axles with very high moments of inertia, for example in the case of axles connected to the drive motors through a gear reducer.

In response to the brake request, the braking system 110 increases a pressure 504 to the brake cylinder 211. Due to an adhesion condition between the wheel 202 and the rail, when the axle braking force generated by the pressure 504 exceeds the available adhesion force, the wheel starts to slip. The instantaneous estimated linear speed 501 of the axle detaches from the linear speed 502 of the train at the instant 503. Immediately, the anti-slip device 201 activates a "discharge" phase, causing transition 0→1 on the control signals 208, 209 for energizing the pneumatic solenoid valves 220, 221, respectively. From the instant 503, the pressure starts to drop and the timing devices 210, 212 activated by the transitions 0→1 start counting the times T1, T2, respectively. Due to the very low adhesion, although the pressure 504 is decreasing against the activation of the discharge phase, the instantaneous estimated linear speed 501 continues to drop, falling far below a tolerance band 505, stopping its descent when the braking force produced by pressure 504 becomes less than the low adhesion force.

In this case the anti-slip device 201 continues to remain in the "discharge" phase awaiting for the instantaneous estimated linear speed 501 of the axle to fall within the tolerance band. Due to the low adhesion and the high moment of inertia, the instantaneous estimated linear speed 501 of the axle starts very slowly with an acceleration dv/dt>0 but very low. In this case, the timing devices 210, 212 continue to evolve reaching the value T1, T2, respectively. In particular, the timing device 210 brings its output 213 to the logical state "0," de-energizing the switching element 202, removing the energization to the solenoids 204, 205, returning the system to the "filling" state with consequent definitive locking of the wheels.

It should be noted that, in the case illustrated in FIG. 5, the instantaneous estimated linear speed 501 can leave the tolerance band 505 due to extremely low adhesion simultaneously with slow response times of the pneumatic solenoid valves (220, 221), or due to sudden variations of adhesion, not shown in FIG. 5. In both cases, the anti-slip system adjusts the pressure to the brake cylinder associated with said instantaneous estimated linear speed 501, bringing it back within the tolerance band 405. This is a normal event and is tolerated as long as the continuous permanence of the instantaneous estimated linear speed 501 outside the tolerance band 505 does not persist beyond the time TB.

A third case illustrated in FIG. 6 occurs in cases of software malfunction problems of the algorithm or hardware failure of the microcontroller 207.

In response to the brake request, the braking system 110 increases the pressure 604 to the brake cylinder 211. Due to a low adhesion condition between the wheel 202 and the rail 240, when the axle braking force generated by the pressure 604 exceeds the available adhesion force, the wheel starts to slip. The estimated linear speed 601 of the axle detaches from the linear speed 602 of the train at the instant 603. Immediately, the anti-slip device 201 activates a "discharge" phase, causing transition 0→1 on the control signals 208, 208 for energizing the pneumatic solenoid valves 220, 221, respectively. From the instant 603, the pressure starts to drop and the timing devices 210, 212 activated by the transitions 0→1 start counting the times T1, T2, respectively. As a consequence of the pressure reduction 604, the instantaneous estimated linear speed 601 of axle 202 begins to recover by crossing the tolerance band 605 with a positive slope. At the same time, for reasons of some unexpected software or hardware malfunction of the microprocessor 207, the anti-slip device has no reaction, the instantaneous estimated linear speed 601 of the axle 202 completely recovers the instantaneous linear speed 602 of the vehicle, the pressure does not resume the initial value or at least a value necessary to keep the axle 202 under controlled slipping. In this case, only when the timing devices 210, 212 have reached the value T1, T2 respectively, in particular the timing device 210, will bring its output 213 to the logical state "0," de-energizing the switching element 202, removing the power supply to the solenoids 204, 205, returning the system to a "filling" state with consequent braking, even if causing the wheels to lock. In this specific case, the brake cylinder remains unnecessarily and for all the time T1, T2 without a brake pressure applied, when instead it would be appropriate for safety reasons to restore the brake pressure without waiting for the time T1, T2 to expire.

One way to overcome the first two cases described could be to reset the timing devices, in advance of the expiry of the times T1, T2, effectively forcing an extension of the times T1, T2 and causing via software transitions 1→0→1 of the control signals 208, 209 such as to cause the timing devices to be reset but fast enough to be masked by the mechanical inertia of the pneumatic solenoid valves 220, 221. In the first case, the anti-slip device would be allowed to continue its correct mode of operation, in the second case, the axle 202 would be allowed to recover the instantaneous speed as long as it can reach the tolerance band 405, thus allowing the anti-slip device to reapply minimal pressure. In some cases, the Railway Operators requested to increase the times T1, T2 on the basis of real cases, typically occurring in the autumn/winter season with situations of very low adhesion caused by rotten leaves or snow deposited on the rails for long stretches.

On the other hand, in the third case it would be advisable to have very short times T1, T2 in order to avoid especially for an emergency braking condition remaining for a long time without pressure applied to the brake cylinder in the condition of a failed anti-slip device.

In deciding which possible solutions to adopt, European regulations must be taken into consideration:

EN50126 "Railway applications. The specification and demonstration of reliability, availability, maintainability and safety (RAMS). Basic requirements and generic process"

EN50128 "Railway applications—Communications, signaling and processing systems—Software for railway control and protection systems"

EN50129 "Railway applications. Communication, signalling and processing systems. Safety related electronic systems for signalling"

In particular, the EN50126 standard (according to the latest version published on 8 Mar. 2019) defines the methodology for assigning the SIL0/1/2/3/4 safety levels to the subsystems based on the results of the Safety Analysis, while the EN50128 and EN50129 standards (according to the latest version published on 8 Mar. 2019) define the design criteria to be applied to the Software and Hardware components respectively based on the assigned SIL levels. Based on the application of the previously cited standards, the following statements and concepts can be expressed:

Electronic systems used for the realization of the Service Braking function can generally be made according to the provisions dictated by the aforementioned standards, limiting said realization to safety levels not higher than SIL2.

Electronic systems used for the realization of the Emergency Braking function can be made according to the provisions dictated by the aforementioned rules, restricting said realization to safety levels not lower than SIL3.

The current anti-slip systems are generally made in accordance with the SIL2 levels of the EN50128, EN50129 standards. The possible solution to reset timing devices with rapid transitions 1→0→1 goes against the same safety reason for which the timing devices are introduced. Only a construction carried out in accordance with the SIL≥3 level in relation to the EN50128, EN50129 standards, based on an observation of the proper dimensions of the complete anti-slip system and a consequent rational reaction could allow an adequate and safe introduction of the re-trigger solution of the timing devices during emergency braking.

The complexity of the anti-slip algorithms, the fact that they increasingly use adaptive criteria, makes the development of anti-slip systems in accordance with SIL≥3 safety levels according to EN50128, EN50129 standards extremely complex and expensive. It is known that the ratio of development complexity and cost to certification between SIL systems≤2 and SIL systems≥3 typically ranges between 1:20 and 1:40. The high amount of parametrization, the complexity of adapting the interfaces between the anti-slip algorithms, the brake control algorithms, the synchronization algorithms between the pneumatic braking and the regenerative braking obtained through the use of drive motors requires partial continuous rewriting of the anti-slip algorithms, with consequent costly SIL4 EN50128 re-certification.

Furthermore, the use of a device developed according to the SIL2 level EN50128, EN50129, being in fact used to reduce the braking force for a certain period, goes against the normal safety analyses for Emergency Braking performed in accordance with the EN50126 standard. In fact, it is a frequent case that Railway Operators or Safety Agencies now request the inhibition of anti-slip devices during Emergency Braking, clashing with the need to have the anti-slip device active especially during Emergency Braking, as in this situation it is necessary to have all the means to assist the recovery of adhesion and the achievement of the shortest stopping distance.

It is therefore prior art to avoid carrying out voluntary re-trigger actions of the timing devices by means of the anti-slip device itself, while only applying the times T1, T2 provided for by the UIC and EN, further agreeing to inhibit the anti-slip device during the Emergency Braking.

SUMMARY OF THE DISCLOSURE

An object of the present disclosure is therefore that of obviating the counter-productive cases of the known anti-slip devices by means of a solution which presents reduced complexity and development costs.

In summary, the present patent describes the use of a supervising device for a railway anti-slip system. The supervising device being arranged to monitor the behavior of the associated anti-slip system and, through direct or indirect actions on the timing devices of said anti-slip system, and to increase its overall safety level so as to reach the safety levels required by the braking systems during the emergency braking phase. Furthermore, the intervention of the supervising device on the timing devices improves.

Furthermore, the supervising device can replace the anti-slip system if malfunctions of said anti-slip system occur.

The above and other objects and advantages are achieved, according to an aspect of the disclosure, by a supervising device having the features defined in claim 1. Preferred embodiments of the disclosure are the defined in the dependent claims, whose content is to be understood as an integral part of the present description.

BRIEF DESCRIPTION OF THE FIGURES

The functional and structural features of some preferred embodiments of an electronic emergency and service braking control system according to the disclosure will now be described. Reference will be made to the accompanying drawings, in which.

DETAILED DESCRIPTION

Figure 1:
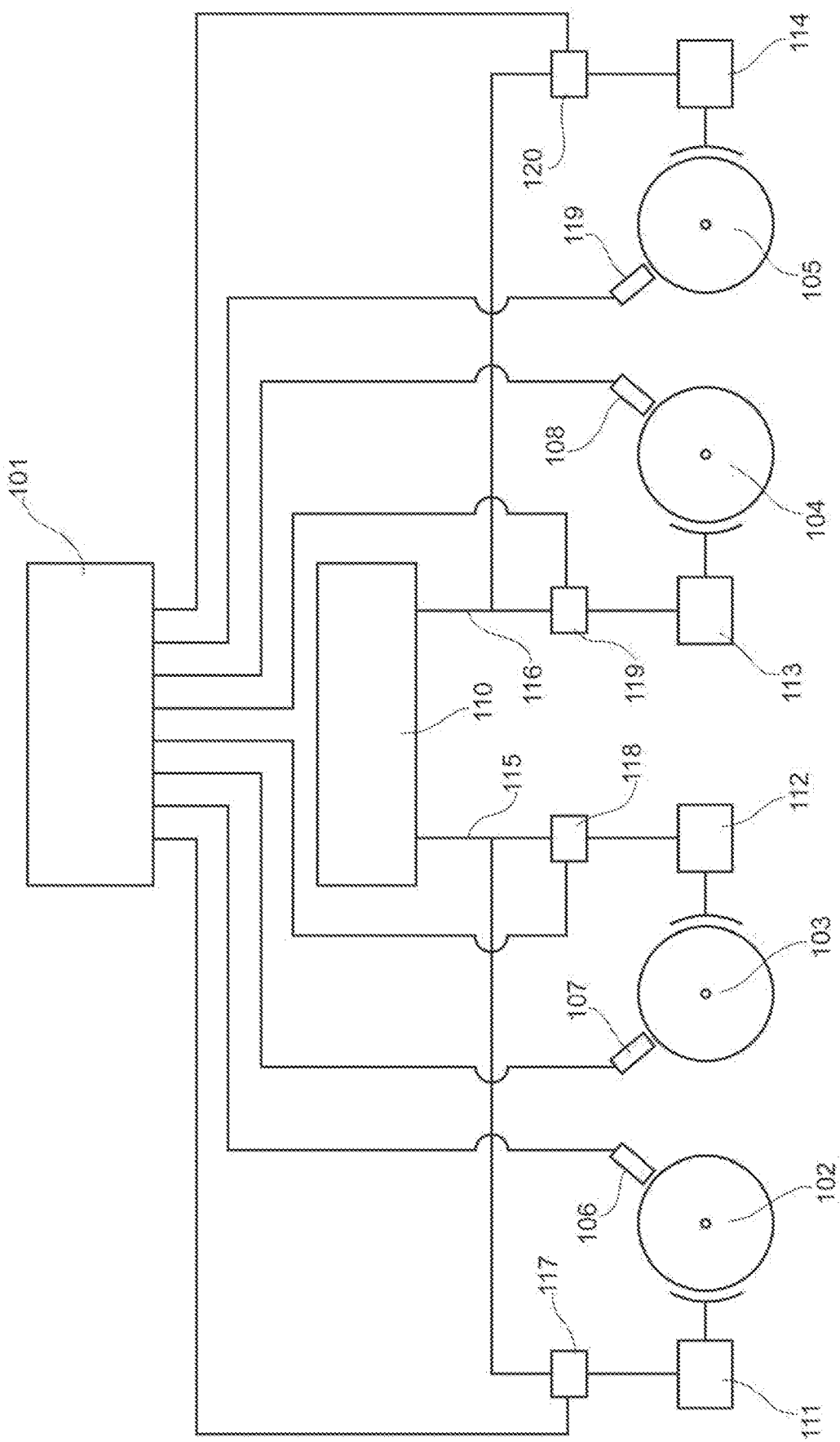
FIG. 1 shows a known anti-slip system.

Before explaining a plurality of embodiments of the disclosure in detail, it should be noted that the disclosure is not limited in its application to the construction details and to the configuration of the components presented in the following description or shown in the drawings. The disclosure can take other embodiments and be implemented or practically carried out in different ways. It should also be understood that the phraseology and terminology are for descriptive purpose and are not to be construed as limiting. The use of "include" and "comprise" and variations thereof are intended as including the elements cited thereafter and their equivalents, as well as additional elements and equivalents thereof.

A first embodiment of a supervising device 701, 801 for monitoring the operation of an anti-slip device 703, 803 of a railway braking system is described below.

The anti-slip device is designed to receive instantaneous speed signals of at least two axles 102, . . . , 105, to control the pressures to brake cylinders 111, . . . , 114 associated with the axles 102, . . . , 105 by means of electro-valve units (117 . . . 120), to prevent blockage of the axles (102 . . . 105) and control the slipping of said axles (102 . . . 105) by controlling the pressures to the brake cylinders 111, . . . , 114) associated with the axles 102, . . . , 105 by means of the electro-valve units 117, . . . , 120.

The electro-valve units 117, . . . , 120 each comprise two pneumatic solenoid valves 220, 221. Each pneumatic solenoid valve 220, 221 is provided with a timing device 210, 212, 726, 727, 826, 827 arranged to measure a supply time of the respective pneumatic solenoid valve 220, 221 and each to generate a signal arranged to de-energize the respective pneumatic solenoid valve 220, 221 if the measured supply time of the respective pneumatic solenoid valve 220, 221 exceeds a predetermined preloaded time value T1, T2.

The supervising device 701, 801 is arranged to acquire instantaneous estimated linear speeds 301, . . . , 304 associated with the axles 102, . . . , 105 controlled by the anti-slip device 703, 803, compare the instantaneous estimated linear speeds 301, . . . , 304 associated with the axles 102, . . . , 105 with a linear reference speed (306) of the railway vehicle, monitor the state of the pressures to the brake cylinders 111, . . . , 114.

The supervising device 701, 801 is further arranged to determine, for each axle in a slipping phase, whether the anti-slip device 703, 803 is working correctly or if it is not working correctly, depending on predetermined operating conditions including predetermined trends of each of the estimated instantaneous linear speeds 301, . . . , 304 associated with the axles 102, . . . , 105 in the slipping phase, with respect to a reference linear speed 306 of the railway vehicle, in association with each of the pressures to the brake cylinders 111, . . . , 114 associated with the axles 102, . . . , 105.

Moreover, the supervising device 701, 801 is arranged to maintain, reduce or cancel the preloaded time value T1, T2 in at least one of the timing devices 726, 727, 826, 827 associated with the axles 102, . . . 105 in the slipping phase, during the execution of counting of said pre-loaded times T1, T2 by said timing devices 726, 727, 826, 827, when the supervising device 701, 801 determines that the anti-slip device 703, 803 is not working correctly.

The supervising device 701, 801 is therefore provided with the aim of acting directly or indirectly on the timing devices.

Preferably, the supervising device 701, 801 is further arranged to maintain or increase the preloaded time value T1, T2 in at least one timing device 726, 727, 826, 827, during counting of said preloaded times T1, T2 by said timing devices 726, 727, 826, 827 associated with the axles 102 . . . 105 in the slipping phase, when the supervising device determines that the anti-slip device 703, 803 is working correctly.

Preferably, it can be determined that the anti-slip device 703, 803 is working correctly if the axles in the sliding state assume one of the following predetermined operating conditions:

an estimated instantaneous linear speed 401 of the axles is included within a tolerance band 405, for at least a predetermined time TP1;

an estimated instantaneous linear speed 501 of the axles is characterized by having an instantaneous acceleration higher than a given acceleration threshold As, for at least a predetermined time TP2.

The tolerance band 405, 505, 605 may be a function of the linear reference speed 402, 502, 602.

Preferably, it can be determined that the anti-slip device 703, 803 is not working correctly if at least one axle in the sliding state assumes one of the following predetermined operating conditions:

a value of an instantaneous pressure 604 of the brake cylinder associated with the at least one axle in the slipping state is representative of the "maintenance" condition, in which the value of pressure to the brake cylinder is kept constant, or of an "emptying" condition, in which the value of pressure to the brake cylinder is zero, simultaneously with an instantaneous linear speed value 606 associated with said instantaneous pressure 604 characterized by being nominally equal to the linear reference speed of the vehicle 602 for a predetermined time TP3;

a value of an instantaneous pressure 604 of the brake cylinder associated with the at least one axle in a sliding state is representative of the "maintenance" or "emptying" condition, simultaneously with an instantaneous linear speed value 607 associated with said instantaneous pressure 604 characterized by evolving outside of a tolerance band 605 with acceleration lower than a predetermined value As for a predetermined time TP3.

Preferably, it can be determined that the anti-slip device 703, 803 is not working correctly if a continuous control procedure between the supervising device 701, 801 and the anti-slip device 703, 803 is not set up correctly.

The continuous control procedure may comprise the exchange of a first master signal 901 generated by the supervising device 701, 801 and received by the anti-slip device 703, 803, and a second slave signal 902 generated at the anti-slip device 703, 803 and received by the supervising device 701, 801.

The master signal 901 has continuous logic state transitions S1, . . . , Sn decided by the supervising device 701, 801 and the slave signal has response logic state transitions A1, . . . , An generated by the anti-slip device 703, 803 in response to the transitions S1, . . . , Sn of the master signal 901.

The response logic state transitions A1, . . . , An are required to occur within a time TOK starting from the corresponding transition S1, . . . , S3 of the master signal 901, so that said anti-slip device 703, 803 is considered to be working properly.

Or, the continuous control procedure may comprise the continuous generation of information requests 1030 generated by the supervising device 701, 801 and received by the anti-slip device 703, 803, and responses 1031 to the information requests 1030.

The responses 1031 are generated by the anti-slip device 703, 803 and received by the supervising device 701, 801. The information requests are taken by the supervising device 801, 803 randomly from a predetermined list 1020, preloaded in a non-volatile memory of the supervising device 801, 803.

The responses 1031 are calculated independently by the anti-slip device 703, 803 and by the supervising device 701, 801.

The anti-slip device 703, 803 is considered to be working correctly as long as the supervising device sees the congruence between the response calculated by itself and the response 1031 sent by the anti-slip device.

In a further aspect, the monitoring of the state of pressure of the brake cylinder 111, . . . , 114 may be carried out directly by means of pressure sensors 222, 223 specific of each anti-slip valve unit 117, . . . , 120 associated with each brake cylinder 111, . . . , 114. One of the two pneumatic solenoid valves 220, 221 may be a pneumatic filling solenoid valve 220. The pressure sensors 222, 223 may respectively indicate the braking pressure upstream of each pneumatic filling solenoid valve 220 of the anti-slip valve units 117, . . . , 120 and the pressure at each brake cylinder 111, . . . , 114.

Preferably, the monitoring of the state of pressure of the brake cylinder 111, . . . , 114 may be carried out indirectly by observation of the state of control signals 208, 209 relating to each anti-slip valve unit 117, . . . , 120 associated with each brake cylinder 111, . . . , 114.

In a further aspect, the preloaded time value T1, T2 may have a value greater than or equal to zero seconds and less than ten seconds.

Preferably, the supervising device 701, 801 may be arranged to calculate the linear reference speed 306, 402, 502, 602 of the railway vehicle, by means of operations performed on the instantaneous speeds 301, . . . , 304 of the axles 102, . . . , 105 and on at least one derived virtual speed 305.

The supervising device 701, 801 may further be arranged to calculate the linear reference speed 306, 402, 502, 602 of the associated railway vehicle by means of operations performed on further instantaneous speed values of axles associated with additional supervising devices or anti-slip devices associated with the same railway train. The further supervising devices and anti-slip devices may be connected to the supervising device 701, 801 by means of a communication network.

The above further speed values may be transmitted by the generating devices according to the standard EN50159 through said communication network according to a level of security equal to or greater than the security level used for the development of the supervising device 701, 801.

In a still further aspect, the supervising device 701, 801 may be arranged to send commands to the anti-slip device 703, 803. The commands are commands requiring logical transitions to the control outputs 208, 209 and are sent through a connection means 750, 850. The connection means 750, 850 can therefore connect the supervising device 701, 801 to the anti-slip device 703, 803. The connection means 750, 850 may comprise one or more digital signals or a communication channel. The plurality of digital hardware signals can allow simple handshake exchanges. The communication channel may be, for example but not exclusively, RS232, RS485, CAN.

Preferably, the supervising device 701 may be arranged to re-read the current residual time value from the timing devices 726, 727 of each anti-slip valve unit 117, . . . , 120 and to reload said timing devices 726, 727 with a value higher than the one re-read, in the case in which it is intended to implement an extension of the remaining time to be counted. Or, the supervising device 701 may be arranged to recharge said timing devices 726, 727 with a value lower than the one re-read or with a null value, in the case in which it is intended to implement a reduction or zeroing of the remaining time to be counted.

The supervising device may be arranged to:
re-read the current residual time value of internal counters 828, 829 associated with the timing devices 826, 827 of each anti-slip valve unit 117, . . . , 120;
if it is intended to extend the remaining time to be counted, "re-trigger" the timing devices 826, 827 relating to the associated axle 112, . . . , 115 and recharge the internal counters 828, 829 associated with the timing devices 826, 827 with the preloaded time values T1, T2 proper of the timing devices 826, 827;
if it is intended to zero the remaining time to be counted, "reset" the timing devices 826, 827 relating to the associated axle 112, . . . , 115 and zeroing the internal counters 828, 829 associated with the timing devices 826, 827.

Preferably, the supervising device 701, 801 may be arranged to indirectly "retrigger" the timing devices 726, 727, 826, 827 causing a pressure variation 404 sufficient to cause the exit of the instantaneous estimated linear speed 401 from the tolerance band 405. The pressure variation 401 may be obtained by acting on appropriate signals 720, 721, 820, 821.

Preferably, the supervising device 701, 801 may be arranged to inhibit the anti-slip device 703, 803 by means of the appropriate signals 720, 721, 820, 821 to drive directly the anti-slip valves units 117, . . . , 120, by means of further signals 732, 733, 832, 833, in order to operate an anti-slip algorithm.

Preferably, the supervising device 701, 801 may be arranged to inhibit the anti-slip device 703, 803 by means of the appropriate signals 720, 721, 820, 821 and to directly control the anti-slip valve units 117, . . . , 120 via additional signals 732, 733, 832, 833 in order to operate an anti-lock algorithm.

Preferably, the supervising device 701, 801 may comprise a watch-dog circuit 706, 806 arranged to monitor the correct operation of the supervising device 701, 801. The watch-dog circuit 706, 806 being provided with a switching element 710, 810 placed in series on a supply branch of solenoids 714, 715, 814, 815 proper of the anti-slip valve units 117, . . . , 120. The switching element 710, 810 may be positioned in the closed condition by the watch-dog circuit 706, 806 when the watch-dog circuit 706, 806 sees a correct operation of said supervising device 701, 801. The switching element 710, 810 may be positioned in the open condition by the watch-dog circuit 706, 806 when the watch-dog circuit 706, 806 sees a non-correct operation of the supervising device 701, 801.

The supervising device may further comprise an emergency switching element 704, 804 placed in parallel with the switching element 710, 810. The emergency switching element 704, 804 may be in the closed condition when an emergency request signal 705, 805 is in the "inactive" state, and in the open condition when the emergency request signal 705, 805 is in the "active" state.

Preferably, the supervising device 701, 801 is developed in accordance with SIL≥3 levels relative to the EN50128 and EN50129 standards. Furthermore, the aforementioned further speed values will be generated by the generating devices according to the EN50128, EN50129 standards, according to the level equal to or greater than the safety level used for the development of the supervising device 701, 801.

In a further aspect, the supervising device 701, 801 may be realized by means of redundant microprocessor circuits, or by means of redundant programmable logic circuits, or by means of at least one microprocessor circuit and at least one programmable logic circuit.

Preferably, the timing devices 726, 727 and the annexed logic functions 722, 723, 734, 735 may be implemented inside the supervising device. The functions equivalent to the timing devices 726, 727 and the annexed logic functions 722, 723, 734, 735 may be implemented by means of software code or inside the programmable logic circuits.

Figure 7:
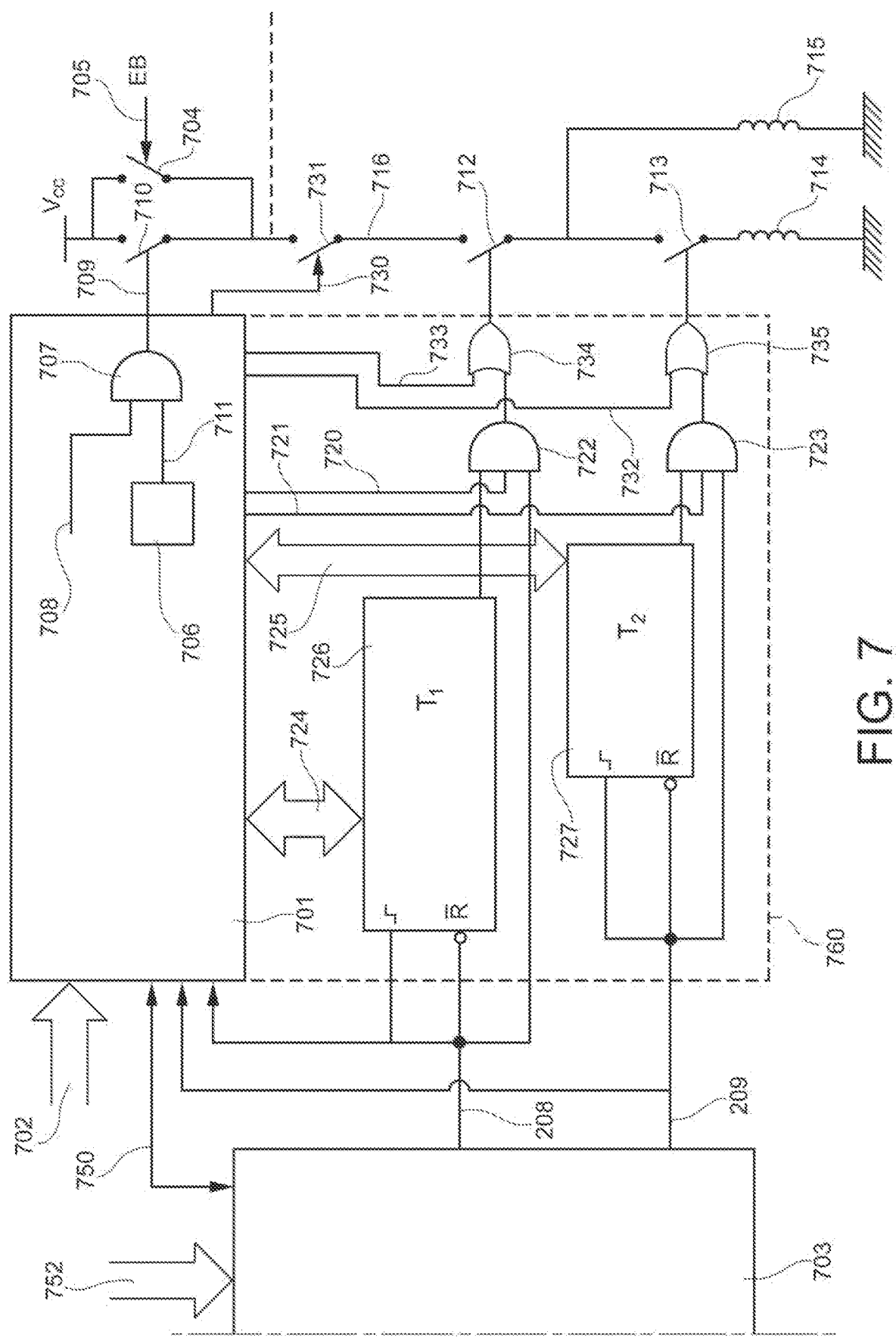
FIG. 7 and FIG. 8 respectively show embodiments of a supervising device.
Figure 8:
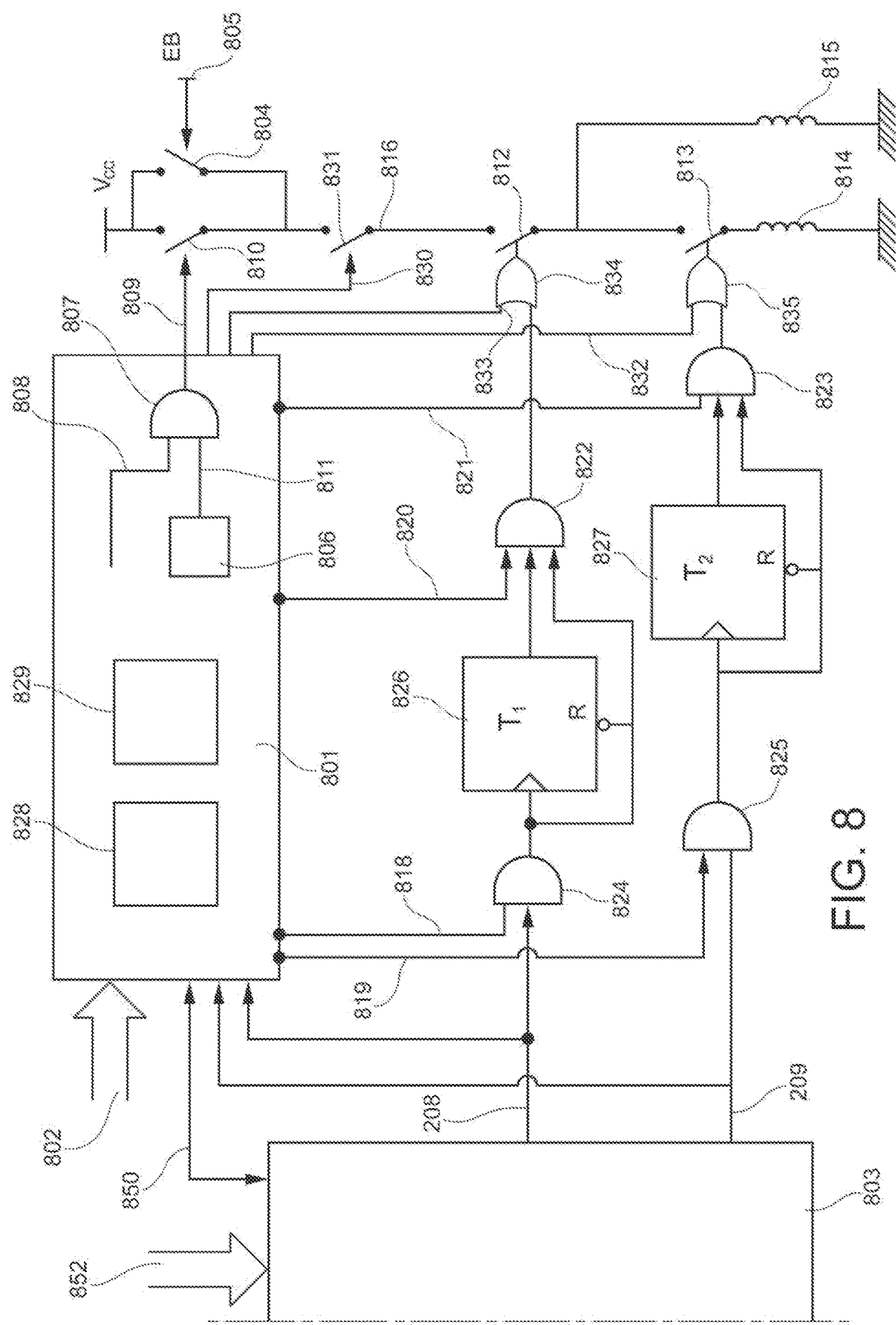

FIG. 7 and FIG. 8 show some non-exclusive embodiment examples.

An embodiment example is described in detail below.

The supervising device 701, 801 receives two or more instantaneous speed signals 702, 802, of the axles 102, 103, 104, 105 coming from speed sensors 106, 107, 108, 109. For example, but not exclusively, by means of the method previously described and illustrated in FIG. 4, the supervising device 701, 801 calculates the instantaneous linear speed of the vehicle in real time. Further, not shown in FIG. 7, 8, the supervising device 701, 801 is connected through a communication bus to other on-board systems such as, for example, but not exclusively other supervising or anti-slip devices from which it can receive speed information of further axles.

Since the calculated instantaneous linear speed of the vehicle has a direct role in analyzing the status of the monitored anti-slip system, the relative calculation function has the same level of safety to which the supervising device 701, 801 must be subjected. For this reason, also the transfer of speed information of axles belonging to other on-board systems must be carried out following the procedures described, for the same safety levels to which the supervising device 701, 801 is subject, according to the European standard EN50159 Railway applications—Communication, signalling and processing systems—Safety-related communication in transmission systems.

The same two or more instantaneous speed signals 752, 852, of the axles 102, 103, 104, 105 are received by the anti-slip device 703, 803 for executing the anti-slip algorithm. Alternatively, the instantaneous speed signals 752, 852 may be generated and transmitted by the supervising device 701, 801 for the anti-slip device 703, 803 as a reproduction of the instantaneous speed signals 702, 802. As a further alternative, the instantaneous speed signals 752, 852 may be generated by the supervising device 701, 801 and transmitted to the anti-slip device 703, 803 through the connection means 750, 850.

The Emergency Braking signal 705, 805, may be in the "inactive" state to indicate no emergency braking request, it is in the "active" state to indicate the emergency braking request is present.

A switching element 704, 804 is in the closed condition when the Emergency Braking signal 705, 805 is "inactive." The switching element 704, 804 is in the open condition when the emergency braking signal 705, 805 is "active."

A Watch-dog function 706, 806 maintains an output thereof 711, 811 at logic level "1" as long as said Watch-dog function 706, 806 verifies the correct operation of the supervising device 701, 801 and switches its output 711, 811 to logic level "0" when said Watch-dog circuit 706, 806 verifies an incorrect operation of the supervising device 701, 801.

In the correct operating condition, since the signal at output 711, 811 is at logic level "1," the supervising device 701, 801 can close the switching element 710, 810, driving the internal signal 708, 808, to logic level "1." The switching element 710, 810 is opened by a signal 709, 809, when the internal signal 708, 808 is brought to logic level "0" by the supervising device 701, 801, or when the Watch-dog circuit 706, 806 detects an error in the operation of the supervising device 701, 801.

Safety systems designed according to the EN50126 standard require the existence of a "safe state" or a state where the target safety level of the project is guaranteed in the presence of a fault that causes the safety system itself to be completely inefficient.

In an anti-slip system controlled by a higher safety system, a "safe state" is, for example but not exclusively, the state of inhibition of the system during emergency braking.

The parallel of switching elements 710, 704, or 810, 804, constitutes the "safe state" of the system: should the supervising device 701, 801 be affected by a fault that does not allow it to carry out the safe supervising activities for which the anti-slip system 703, 803 is allowed to operate during emergency braking, the Watch-dog circuit drives the switching element 710, in the open condition, allowing the Emergency Braking signal 705, 805 in the active Emergency Braking condition, to remove the power supply to the solenoids 714, 715 or 814, 815, opening the switch 704, 804 bringing the overall system to the condition of inhibiting the anti-slip function during emergency braking. Should it be required to inhibit the anti-slip function even during service braking, if the supervising device 701, 801 is affected by a fault that does not allow it to carry out the safe supervising activities, the signal 730, 830 is connected to the signal 709, 809, respectively. In this way, the Watch-dog device 706, 806 inhibits the anti-slip device 703, 803 also during service braking by opening the switching element 731, 831, when a malfunction is found in the supervising device 701, 801.

The switching element 712, 812 corresponds functionally to the switching element 202, being used to energize the solenoid 715, 815 corresponding to the solenoid 204 of the pneumatic solenoid valve 220. The switching element 713, 813 corresponds functionally to the switching element 203, being used to energize the solenoid 714, 814 corresponding to the solenoid 205 of the pneumatic solenoid valve 221.

The timing devices 726, 727 are digital counters whose count is timed by a clock not shown in the FIG. Their content can be read or modified by the supervising device 701 by means of the bidirectional buses 724, 725, respectively.

The timing devices 826, 827 are monostable of the analog type. In order to know the remaining time to be counted by the two timing devices 826, 827, the supervising device 801 emulates the behavior of said timing devices 826, 827 by means of two software counters 828, 829. The two software counters 826, 827 are preloaded with a time corresponding nominally to the counting times T1, T2 of the respective timing devices 826, 827. The control signals 208, 209 are read by the supervising device 801. When the combinations of the command signals 208, 818, and 209, 819 operate by starting or resetting the respective timing devices 826, 827, through respective logic gates 824, 825, the supervising device 801 performs the same operations on the two respective software counters 826 827, thus having continuous and real-time knowledge of the time counting status of the respective timing devices 826, 827.

The supervising device 701, 801 normally maintains the signals 732, 733 or 832, 833 at logic level "0" making the logic gates "OR" 734, 735 or 834, 835 transparent for the output signals of the logic gates "AND" 722, 723, or 822, 823.

Figure 2:
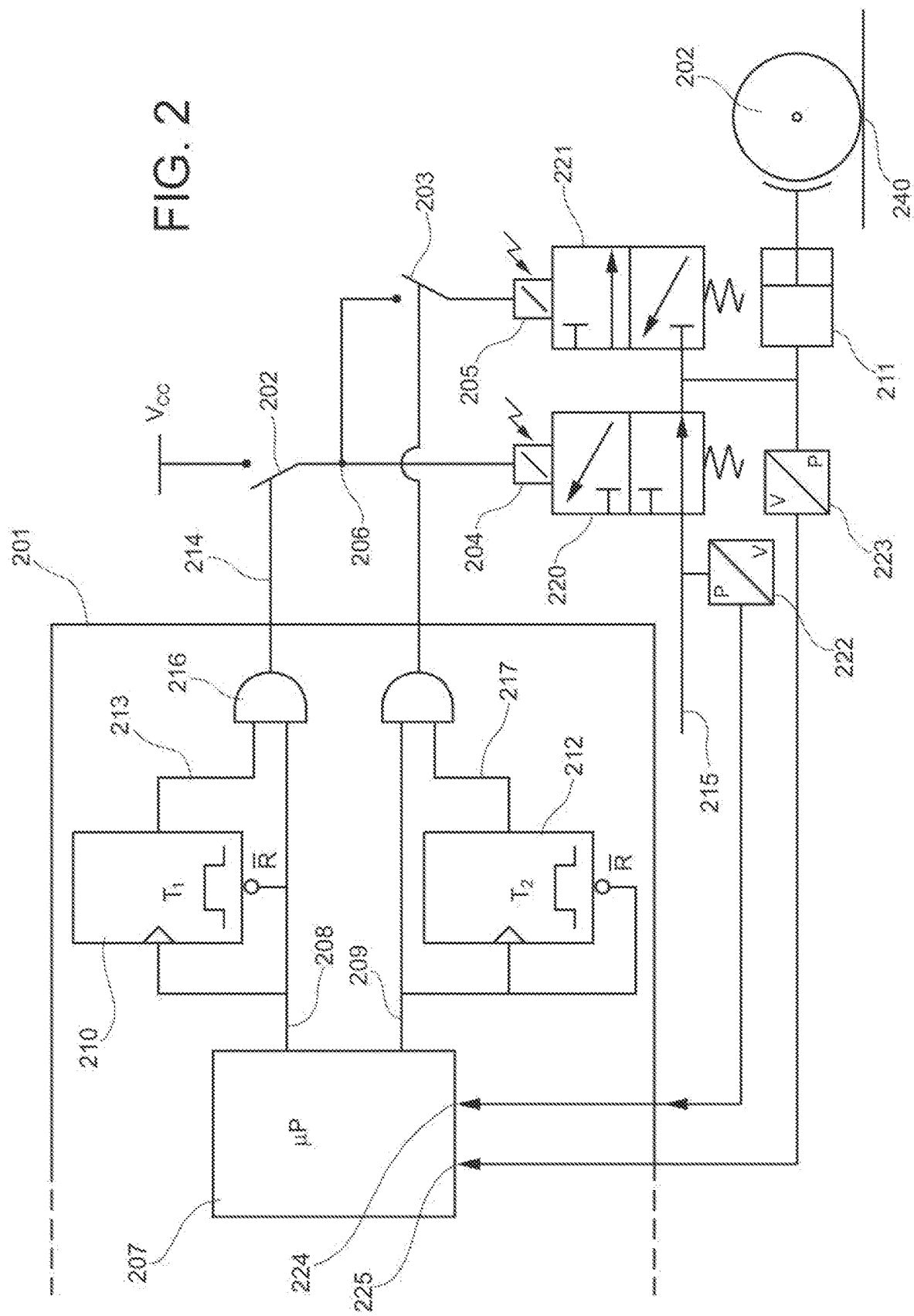
FIG. 2 shows a functional embodiment of a control system of an anti-slip system.
Figure 3:
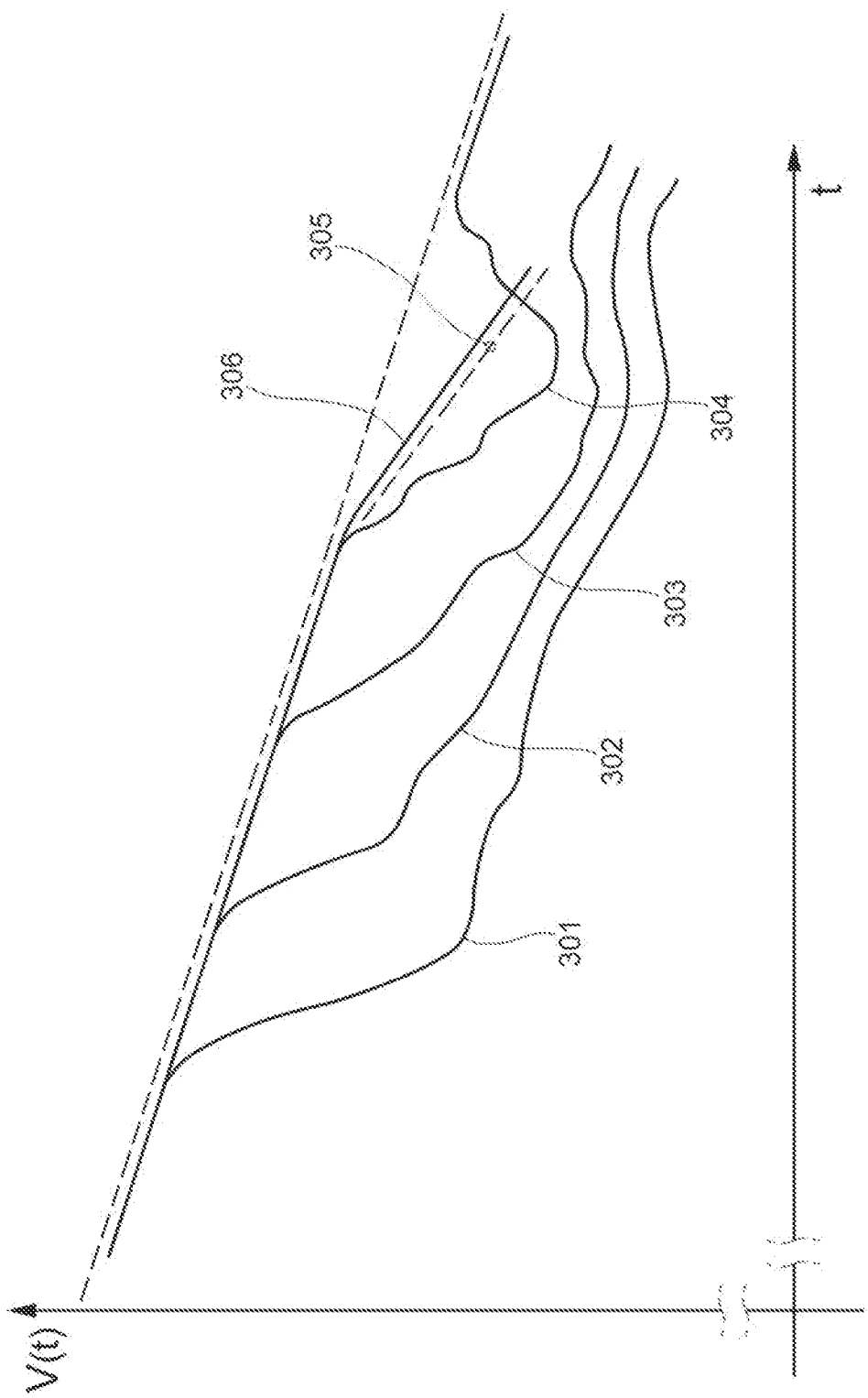
FIG. 3 shows the trend of the instantaneous speed time of the axles and of a derived virtual speed.

The supervising device 701, 801 normally maintains signals 720, 721 or 820, 821, at logic level "1" to enable the logic gates "AND" respectively 722, 723 or 822, 823 to operate according to the status of the other input signals to said logic gates 722, 723 or 822, 823. When signals 720, 721 or 820, 821 are kept at logic level "1" and signals 732, 733 or 832, 833 are kept at logic level "0" by the supervising device 701, 801, the anti-slip device 703, 803 acts on the timing devices 726, 727 or 826, 827 and on the switching elements 712, 713 or 812, 813 similarly to what is described for the circuit of FIG. 2.

At any time, for example when the supervising device 701, 801 detects a malfunction in the anti-slip device 703, 803, the supervising circuit 701, 801 can decide as a first solution to inhibit the anti-slip system by opening the contact 731, 831 by means of the signals 730, 830, or by bringing signals 818, 819, or 720, 721, or 820, 821 to logic level "0." Furthermore, the supervising device 701, 801 can decide to replace the anti-slip device 703, 803, inhibiting the anti-slip device 703, 803 bringing the signals 720, 721 or 820, 821 to logic level "0" and directly controlling the status of the solenoids 715, 714 or 815, 814 by directly driving the switching elements 712, 713 or 812, 813 through the respective signals 733, 732 or 833, 832. In this case, the algorithm used by the supervising device 701, 801 may be of an extremely simplified type, to simplify an EN50128 SIL≥3 certification, for example a simple derivative algorithm sensitive to instantaneous speed variations of the axle, and with an instantaneous speed threshold of the axle below which the anti-slip valve unit is put in the "emptying" state for a time sufficient to avoid locking conditions of the wheels.

The supervising device 701, 801 can permanently monitor the activities of the anti-slip device 703, 803, comparing the individual behavior of the instantaneous linear speed of each axle 102, 103, 104, 105 with the linear reference speed of the vehicle, and simultaneously observe the state of each pneumatic pressure relative to the brake cylinder specific to each axle 102, 103, 104, 105.

Furthermore, the supervising device 701, 801 can monitor the activities of the outputs 208, 209 of the anti-slip device 703, 803.

The state of a pressure relative to the brake cylinder 211 can be observed as the difference between the braking pressure 215, read by means of the sensor 222, and the pressure to the brake cylinder 211, read by means of the pressure sensor 223.

The "filling" state indicative of full braking corresponds to the pressure value to the brake cylinder 211 nominally equal to the braking pressure 215.

The "holding" state corresponds to a pressure value to the brake cylinder 211 constant and lower than the braking pressure 215. In particular, it is known to those skilled in the art that the difference between the braking pressure 215 and the pressure to the brake cylinder 211 is indicative of the adhesion value at the point of contact between the axle and the rail, that is, the greater the difference, the smaller the friction coefficient.

The "emptying" status indicative of a complete release of the brake corresponds to a null pressure value to the brake cylinder 211.

In the absence of the pressure sensors 222, 223, the state of a pressure relative to the brake cylinder 211 can be deduced from the state of the control signals 208, 209 according to the definitions initially provided, i.e. the "filling" state corresponds to both pneumatic solenoid valves de-energized, the "maintenance" state corresponds to the energization of the pneumatic solenoid valve 220 only, the "discharge" state corresponds to the simultaneous energization of the pneumatic solenoid valves 220, 221.

For each axle 102 . . . 105, and on the basis of the individual behavior of the instantaneous speed of each axle 102, . . . , 105 with the reference speed of the vehicle, and the state of each pneumatic pressure relative to the brake cylinder 111, . . . , 114 specific to each axle 102, . . . , 105, the supervising device 701, 801 can decide not to intervene, or to prolong, reduce, reset the times T1, T2 associated with each valve unit 117, . . . , 120 according to good operation or identified malfunction situations.

Figure 4:
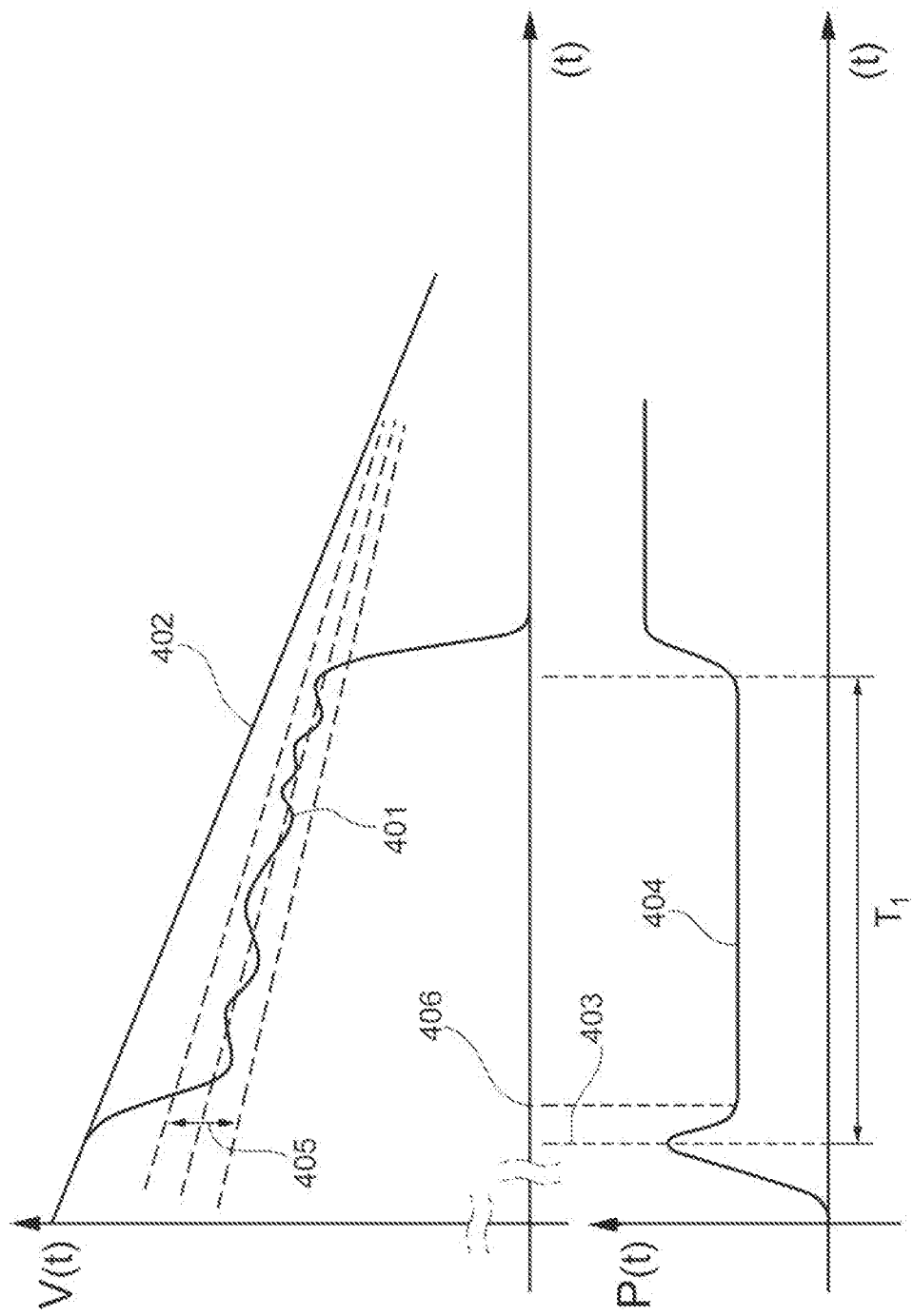
FIG. 4 shows explanatory graphs of a first counter-productive case of timing circuits according to the prior art.
Figure 5:
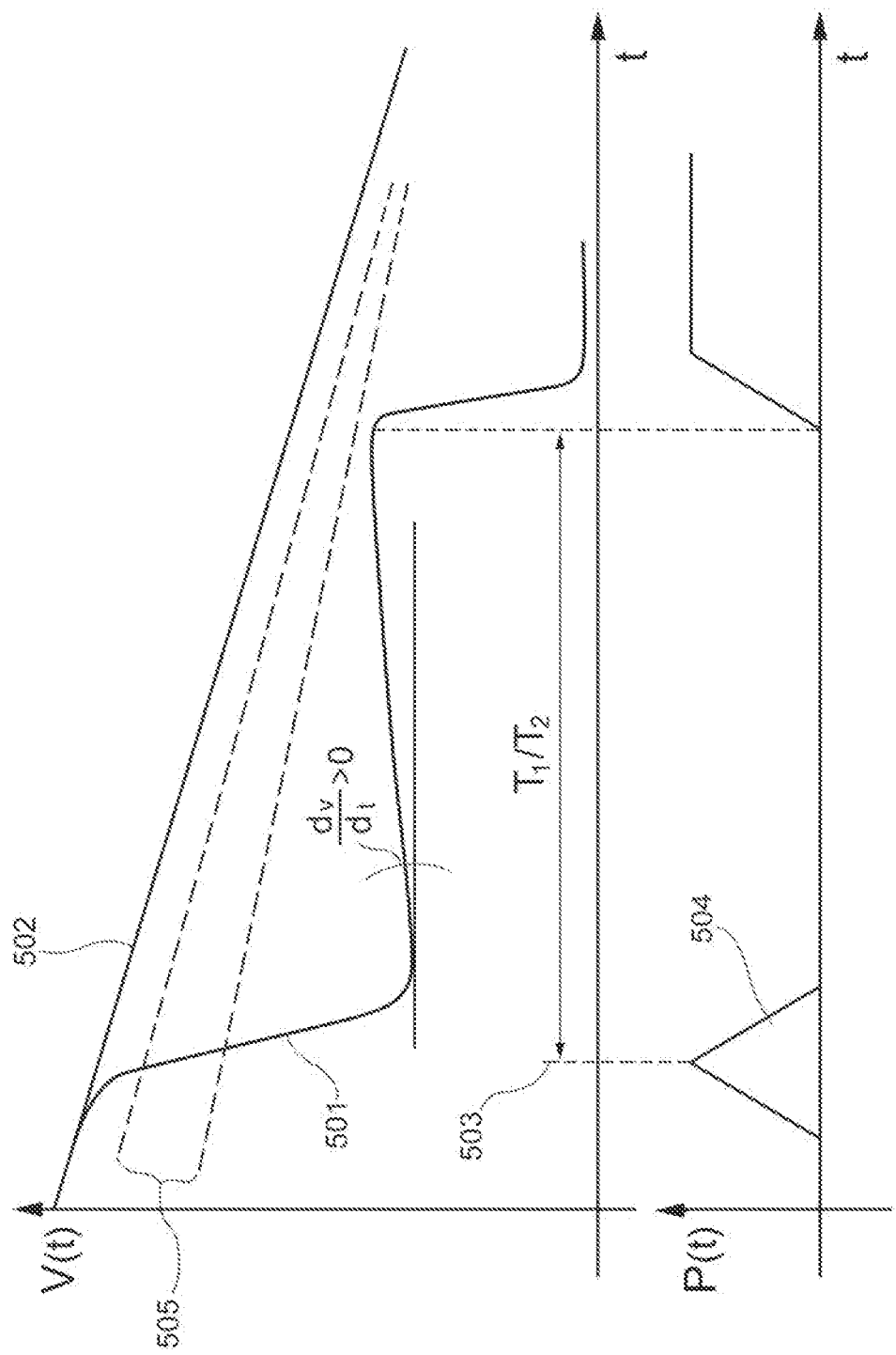
FIG. 5 shows explanatory graphs of a second counter-productive case of timing circuits according to the prior art.

Cases in which the supervising device may decide not to intervene or to prolong the times T1, T2 are represented, for example, but not exclusively in FIG. 4 and FIG. 5.

The supervising device can decide not to intervene when the instantaneous linear speed 607 remains outside the band 604 for a time longer than TB.

Figure 6:
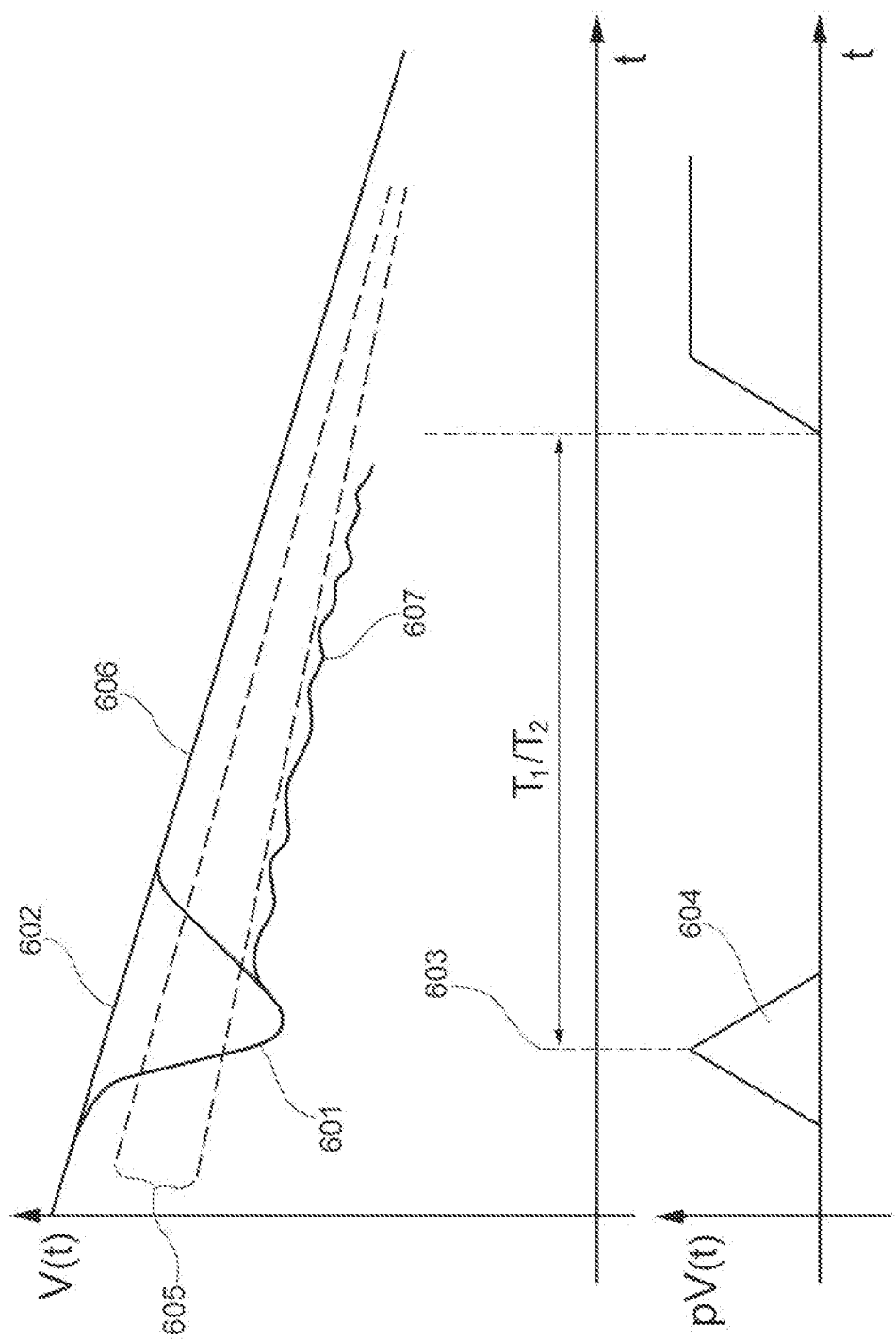
FIG. 6 shows explanatory graphs of a third counter-productive case of timing circuits according to the prior art.

A case in which the supervising device can decide to reduce or reset the times T1, T2 is represented for example but not exclusively in FIG. 6.

The supervising device 701 can extend the times T1, T2 of the timing devices 726, 727, respectively, for example but not exclusively by reading the residual times in the timing devices 726, 727 by means of the buses 724, 725, respectively, and by reloading in said timing devices 726, 727 a time value greater than the remaining time. The supervising device 701 can shorten the times T1, T2 of the timing devices 726, 727 for example, but not exclusively by reading the residual times in the timing devices 726, 727 by means of the buses 724, 725, respectively, and by reloading in said timing devices 726, 727 a time value less than the remaining time or a null value.

The supervising device 801 can extend the times T1, T2 of the timing devices 826, 827, respectively, for example by directly re-triggering the timing devices by means of a rapid transition 1→0→□1 performed on signals 818, 819. In this case the timing devices will reload the times T1, T2 respectively.

The supervising device 801 can reset the times T1, T2 of the timing devices 826, 827, respectively, for example by directly resetting the timing devices 826, 827 permanently by means of a permanent transition 1→0 performed on signals 818, 819.

In a second mode, the supervising device 701, 801 can indirectly re-trigger the times T1, T2 causing a minimum destabilization of the system, so that it is the anti-slip circuit itself 703, 803 that directly re-triggers the timing devices 726, 727 or 826, 827. The supervising device 701, 801 can destabilize the system by causing an "emptying" state by energizing the signals 732, 733 or 832 833 for a time long enough to cause a pressure reduction to the brake cylinder 221, said reduction being sufficient to bring the estimated linear speed 401 outside the upper part of the tolerance band 405. At this point, the anti-slip device, if active and correctly functioning, will react by bringing the system to a "filling" state by acting on signals 208, 209 and re-triggering the timing devices 726, 727 or 826, 827. Moreover, the anti-slip device will cause the estimated linear speed 401 to fall within the tolerance band 405. The supervising device 701, 801 detects the correct reaction of the anti-slip device 703, 803 by monitoring the outputs 208, 209 of the anti-slip device 703, 803.

Additionally, the supervising device 701, 801 can urge the anti-slip device 703, 803 by requesting the anti-slip device 701, 801 itself to perform a transition 1→0→1 on the outputs 208, 209 by a request made through the communication means 750, 850. This method is particularly useful in the case shown in FIG. 5, where the anti-slip device tends to constantly keep its outputs 208, 209 in the logical state "1" as long as the estimated linear speed 501 of the axle does not fall within the tolerance band 505. Any other method previously described would lead to the re-trigger of the timing devices 726, 727 or 826, 826 obtaining the purpose of lengthening the times, but would not result in a transition of the outputs 208, 209 such as to allow the supervising device 701, 801 to check the status of "life" of the anti-slip device 703, 803.

In the case illustrated in FIG. 7, having observed the system malfunction, the supervising device 701, 801 can decide to immediately and permanently reapply the brake pressure by acting on the available signals without waiting for the timing devices 726, 727 or 826, 827 to make times T1, T2 expire.

Furthermore, the supervising device can replace the anti-slip device as described above, inhibiting the anti-slip device 703, 803 bringing the signals 720, 721 or 820, 821 to logic level "0" and directly controlling the status of the solenoids 715, 714 or 815, 814 by directly driving the switching elements 712, 713 or 812, 813 through the signals 733, 732 or 833, 832, respectively.

The circuits of FIG. 7 or FIG. 8 are specific to each valve unit 117, 118, 119, 120 associated with the anti-slip device 101, 703, 803 and with the supervising device 701, 801.

One method for strengthening the criteria according to which the supervising device 701, 801 considers the behavior of the anti-slip system 703, 803 to be correct is that whereby the supervising device 701, 801 implements a continuous exchange of handshakes with the anti-slip system 703, 803 by means of the connection means 750, 850, checking the correct reaction of the anti-slip device.

Figure 9:
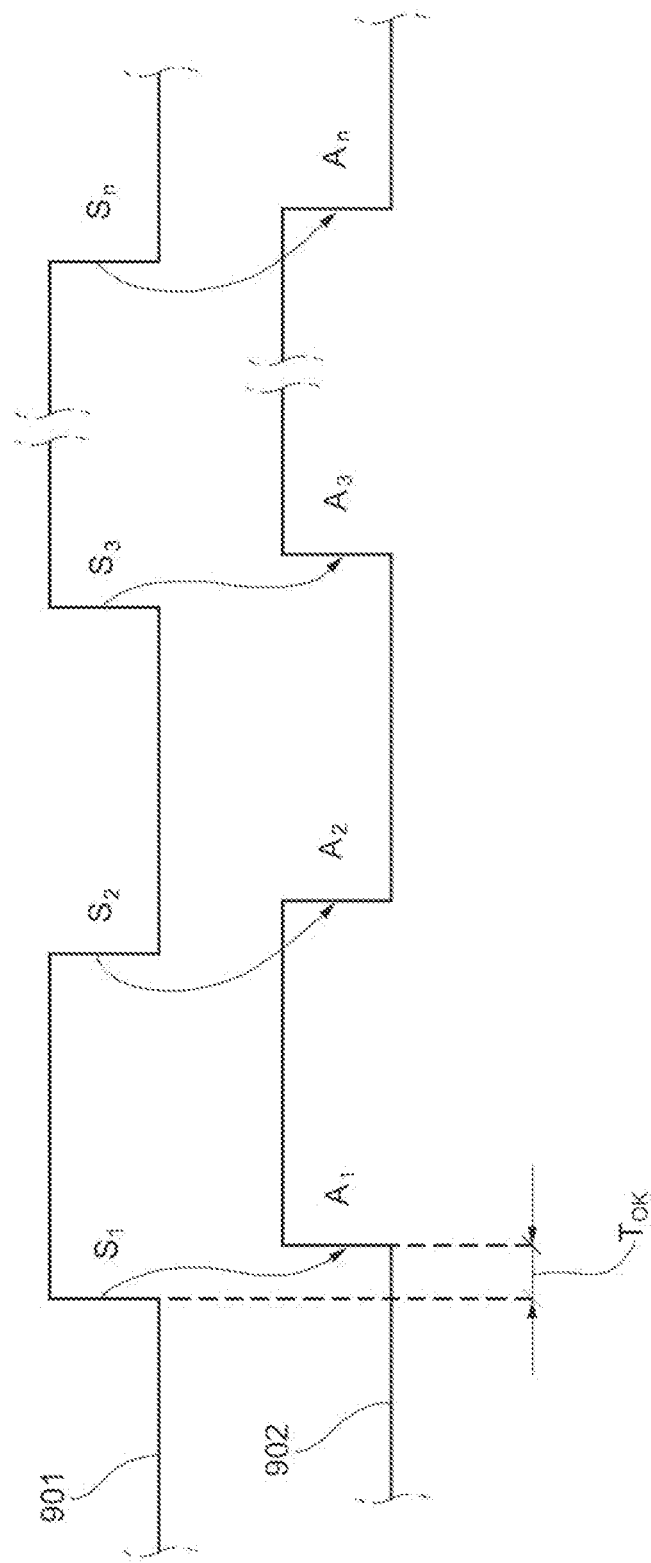
FIG. 9 shows a continuous exchange of handshakes of the supervising device with the anti-slip system to verify the correct reaction of the anti-slip device.

If the connection means 750, 850 consists of hardwired discrete signals, an exemplary but not exclusive method is illustrated in FIG. 9: a digital signal 901 belonging to the set of discrete signals 750, 850 is generated by the supervising device 701, 801 and received by the anti-slip device 703, 803. A digital signal 902 belonging to the set of discrete signals 750, 850 is generated by the anti-slip device 703, 803 and received by the supervising device 701, 801. The signal 901 is generated for example but not exclusively at variable frequency. The signal 902 is generated in response to the signal 901, that is, the anti-slip device 703, 803 responds with a variation A1, A2, . . . An of the logical state of the signal 902 at each variation S1, S2 . . . Sn of the logical state of the signal 901. The anti-slip device 703, 803 monitors the signal 901 and performs the variations A1, A2, . . . An exclusively by means of software functions integrated in the program flow relating to the anti-slip function, completely released from execution under interrupt call. The supervising device 701, 801 considers the health status of the anti-slip device 703, 803 to be correct when a change in the logic state A1, A2, . . . An of signal 902 is detected in response to a change in the logic state S1, S2, . . . Sn of signal 901 within a maximum time TOK.

Figure 10:
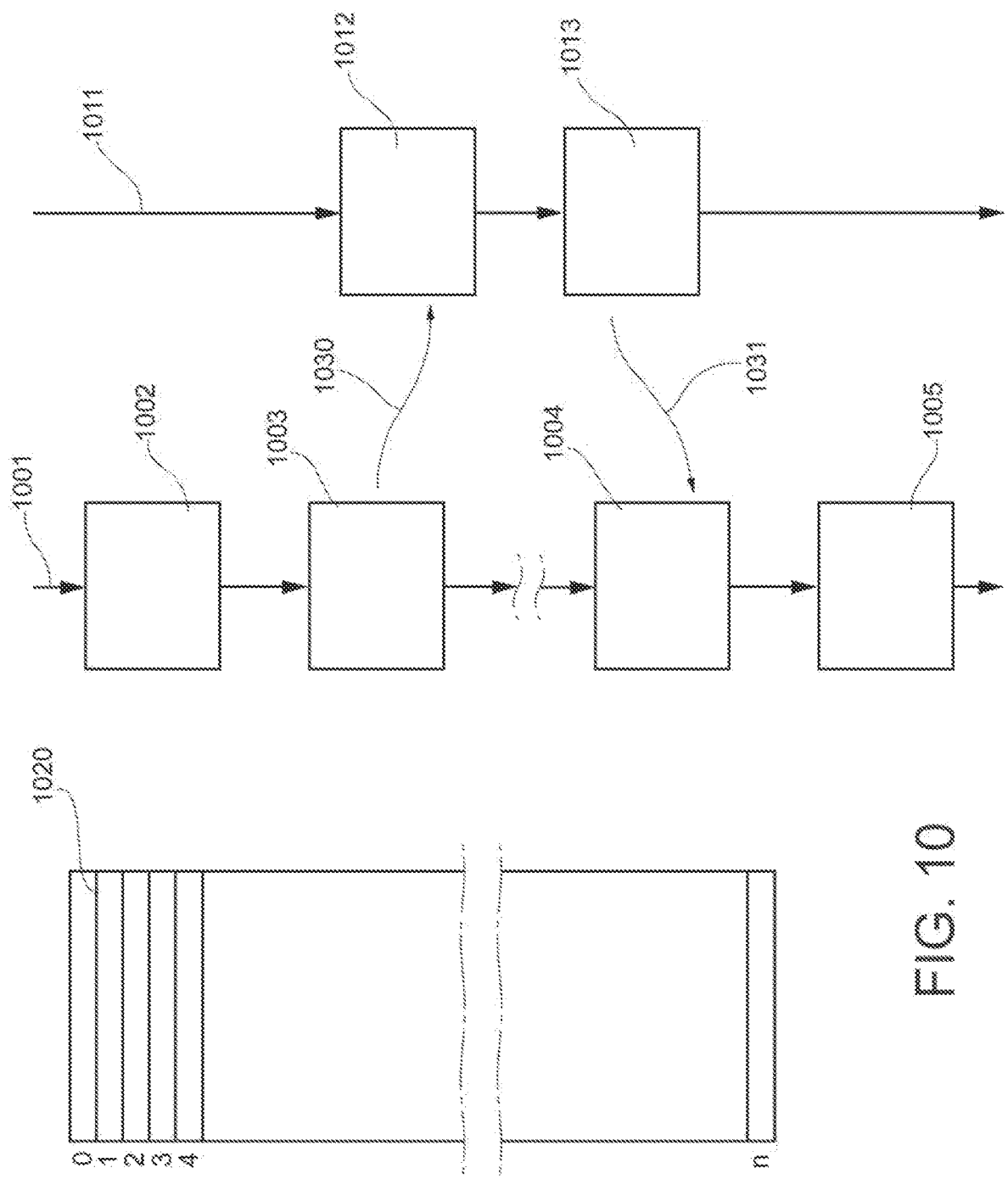
FIG. 10 shows by way of example an exchange of information between the supervising device and the anti-slip system, when the connection means consists of a communication channel.

If the connection means 750, 850 consists of a communication channel, an exemplary but not exclusive method is represented by an exchange of information illustrated in FIG. 10.

The supervising device 701, 801 has a list 1020 of n requests for information available to be sent to the anti-slip device 703, 803. The requests for information provide, for example, but not exclusively, requests for information relating to variable states of the system whose responses are not known in advance but can be obtained in real time both from the supervising device 701, 801 and from the anti-slip device 703, 803.

The supervising device 701, 801 performs the flow 1001 cyclically, for example but not exclusively at variable frequency: in 1002 the generation of a random number in a range 0÷n is performed, with n corresponding to the maximum number of possible requests for information, and a request for information is taken from a list of requests for information 1020.

In 1003 the supervising device 701, 801 sends the information request to the anti-slip device 703, 803 through the communication channel constituting the connection means 750, 850.

In 1012 the anti-slip device 703, 803 processes the response to the request for information received.

In 1013 the anti-slip device 703, 803 sends the processed response to the supervising device 701, 801.

In 1004 the supervising device 701, 801 in turn processes the response to the request for information taken in 1002 from the list of requests for information 1020.

In 1005 the supervising device 701, 801 verifies the congruence between the response processed by it and the response processed by the anti-slip device 703, 803.

In both cases described, if the supervising device 701, 801 finds an incorrect reaction by the anti-slip device 703, 803, it can decide to immediately reset the times T1, T2 and inhibit the operation of the anti-slip device 703, 803 by opening the switching element 701, 801 or by forcing the signals 720, 721, 820, 821 to the logical state "0."

The functions described in FIG. 7 and FIG. 8 can be implemented in various alternative embodiments.

The supervising circuit 701, 801 may be implemented by means of one or more microprocessors, or by means of one or more FPGA circuits, or by means of an assembly formed by a microprocessor and by an FPGA circuit, according to an architecture such that the integration between the supervising circuit 701, 801 with the anti-slip system results in an overall safety level of the anti-slip function SIL≥3 according to EN50126.

The functionalities corresponding to the circuit portion included within the dotted line 760 may optionally be completely implemented in software mode within the microprocessors or FPGAs constituting the supervising device 701.

The switching elements 704, 710, 731, or 804, 810, 831 may be relays or solid-state devices.

The limitations of the embodiment shown above constitute a currently preferred embodiment but can be varied without departing from the wider scope defined in the main claim.

The advantage thus obtained is that of obtaining a solution which obviates the counter-productive cases of the known anti-slip devices, through a solution with complexity and reduced costs.

Various aspects and embodiments of a method for implementing a supervising device according to the disclosure have been described. It is understood that each embodiment may be combined with any other embodiment. The disclosure, moreover, is not limited to the described embodiments, but may be varied within the scope defined by the appended claims.

The invention claimed is:

1. Supervising device for monitoring the operation of an anti-slip device of a railway braking system; said anti-slip device being arranged to:
receiving instantaneous speed signals of at least two axles;
controlling pressures to brake cylinders associated with said axles by means of electro-valve units;
preventing blockage of the axles and controlling the slipping of said axles by controlling the pressures to the brake cylinders associated with said axles by means of said electro-valve units;
said electro-valve units each comprising two pneumatic solenoid valves; each pneumatic solenoid valve being provided with a timing device arranged to measure a supply time of the respective pneumatic solenoid valve and each to generate a signal arranged to de-energize said respective pneumatic solenoid valve if the measured supply time of the respective pneumatic solenoid valve exceeds a predetermined preloaded time value;
the supervising device being arranged to:
acquiring estimated instantaneous linear speeds associated with the axles controlled by said anti-slip device;
comparing said estimated instantaneous linear speeds associated with axles with a linear reference speed of the railway vehicle;

monitoring the state of the pressures to the brake cylinders;

determining, for each axle in a slipping phase, whether said anti-slip device is working correctly or if it is not working correctly, depending on predetermined operating conditions including predetermined trends of each of the estimated instantaneous linear speeds associated with the axles in the slipping phase, with respect to the reference linear speed of the railway vehicle, in association with each of the pressures to the brake cylinders associated with the axles;

maintaining, reducing or canceling the preloaded time value in at least one of the timing devices associated with the axles in the slipping phase, during the execution of counting of said pre-loaded times by said timing devices, when the supervising device determines that the anti-slip device is not working correctly.

2. Supervising device according to claim 1, further arranged to maintain or increase the preloaded time value in at least one timing device, during counting of said preloaded times by said timing devices associated with the axles in the slipping phase, when said supervising device determines that the anti-slip device is working correctly.

3. Supervising device according to claim 1, wherein it is determined that said anti-slip device is working correctly if the axles in the slipping state assume one of the following predetermined operating conditions:

an estimated instantaneous linear speed of the axles is included within a tolerance band, for at least a predetermined time;

an estimated instantaneous linear speed of the axles is wherein having an instantaneous acceleration higher than a given acceleration threshold, for at least a predetermined time.

4. Supervising device according to claim 1, wherein it is determined that said anti-slip device is working not correctly if at least one axle in the slipping state assumes one of the following predetermined operating conditions:

a value of an instantaneous pressure of the brake cylinder associated with the at least one axle in the slipping state is representative of a "maintenance" condition, in which the value of pressure to the brake cylinder is kept constant, or of a "emptying" condition, in which the value of pressure to the brake cylinder is zero, simultaneously with an instantaneous linear speed value associated with said instantaneous pressure wherein being nominally equal to the linear reference speed of the vehicle for a predetermined time;

a value of an instantaneous pressure of the brake cylinder associated with the at least one axle in a slipping state is representative of the "maintaining" or "emptying" condition, simultaneously with an instantaneous linear speed value associated with said instantaneous pressure wherein evolving outside of a tolerance band with acceleration lower than a predetermined value for a predetermined time.

5. Supervising device according to claim 1, wherein it is determined that said anti-slip device is working not correctly if a continuous control procedure between the supervising device and the anti-slip device is not set up correctly.

6. Supervising device according to claim 5, wherein the continuous control procedure comprises the exchange of a first master signal generated by the supervising device and received by the anti-slip device, and a second slave signal generated at the anti-slip device and received by the supervising device;

said master signal having continuous logic state transitions decided by the supervising device and said slave signal having a response logic state transitions generated by the anti-slip device in response to the transitions of the master signal;

said response logic state transitions being required to occur within a time TOK starting from the corresponding transition of the master signal, so that said anti-slip device is considered to be working properly.

7. Supervising device according to claim 5, wherein the continuous control procedure comprises the continuous generation of:

information requests generated by the supervising device and received by the anti-slip device; and responses to information requests;

said responses being generated by the anti-slip device and received by the supervising device; said information requests being taken by the supervising device randomly from a predetermined list preloaded into a non-volatile memory of said supervising device;

said responses being calculated independently by the anti-slip device and by the supervising device;

said anti-slip device being considered to be working correctly as long as the supervising device sees the congruence between the response calculated by itself and the response sent by the anti-slip device.

8. Supervising device according to claim 1, wherein the monitoring of the state of pressure of the brake cylinder is carried out directly by means of pressure sensors specific of each anti-slip valve units associated with each brake cylinder;

one of the two pneumatic solenoid valves being a pneumatic filling solenoid valve;

said pressure sensors respectively indicating the braking pressure upstream of each pneumatic filling solenoid valve of the anti-slip valve units and the pressure at each brake cylinder.

9. Supervising device according to claim 1, wherein the monitoring of the pressure state of the brake cylinder is carried out in-directly by observing the state of control signals relating to each anti-slip valve unit associated with each brake cylinder.

10. Supervising device according to claim 1, wherein the pre-loaded time value has a value greater than or equal to zero seconds and lower than ten seconds.

11. Supervising device according to claim 1, arranged to calculate the linear reference speed of the railway vehicle, by means of operations performed on the estimated instantaneous linear speed values of the axles and on at least one derived virtual speed.

12. Supervising device according to claim 11, arranged to calculate the linear reference speed of the associated railway vehicle by means of operations performed on further instantaneous speed values of axles associated with additional supervising devices or anti-slip devices associated with the same railway train;

said further supervising devices and anti-slip devices being connected to the supervising device by means of a communication network.

13. Supervising device according to claim 3, wherein the tolerance band is a function of the linear reference speed.

14. Supervising device according to claim 13, wherein the further speed values are transmitted by the further generating devices according to the standard EN50159 through said communication network according to a level of security equal to or greater than the security level used for the development of the supervising device.

15. Supervising device according to claim 1, arranged to send commands to the anti-slip device;
- said commands being commands requiring logical transitions to the control outputs and being sent through a connection means;
- said connection means comprising one or more digital signals or a communication channel.

16. Supervising device according to claim 1, arranged to re-read the current residual time value from the timing devices of each anti-slip valve unit, and reload said timing devices with a value higher than the one re-read, in the case in which it is intended to implement an extension of the remaining time to be counted; or,
- recharging said timing devices with a value lower than the one re-read or with a null value, in the case in which it is intended to implement a reduction or zeroing of the remaining time to be counted.

17. Supervising device according to claim 1, arranged for:
- re-read the current residual time value of internal counters associated with the timing devices of each anti-slip valve unit
- if it is intended to extend the remaining time to be counted, "re-trigger" the timing devices relating to the associated axle and recharge the internal counters associated with said timing devices with the preloaded time values proper of said timing devices;
- if it is intended to zeroing the remaining time to be counted, "reset" the timing devices relating to the associated axle and zeroing the internal counters associated with said timing devices.

18. Supervising device according to claim 1, arranged to indirectly "retrigger" the timing devices causing a pressure variation sufficient to cause the exit of the instantaneous estimated linear speed from the tolerance band;
- said pressure variation being obtained by acting on appropriate signals.

19. Supervising device according to claim 1, arranged to inhibit the anti-slip device by means of the appropriate signals to drive directly the anti-slip valves units, by means of further signals, in order to operate an anti-slip algorithm.

20. Supervising device according to claim 1, arranged to inhibit the anti-slip device by means of the appropriate signals and to directly control the anti-slip valve units via additional signals in order to operate an anti-lock algorithm.

* * * * *